United States Patent
Bowler

(10) Patent No.: US 7,633,382 B2
(45) Date of Patent: Dec. 15, 2009

(54) STOP-ARM MOUNTED CAMERA SYSTEM AND METHOD FOR MOUNTING SAME

(75) Inventor: Keith M. Bowler, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 314 days.

(21) Appl. No.: 11/646,161

(22) Filed: Dec. 27, 2006

(65) Prior Publication Data

US 2008/0157945 A1  Jul. 3, 2008

(51) Int. Cl.
- B60Q 1/26  (2006.01)
- B60Q 1/22  (2006.01)
- B60Q 1/34  (2006.01)
- G06F 7/04  (2006.01)
- G08B 25/00 (2006.01)
- G08B 5/00  (2006.01)
- H04N 7/18  (2006.01)

(52) U.S. Cl. .................. 340/433; 340/5.8; 340/463; 340/465; 340/525; 340/815.4; 348/148

(58) Field of Classification Search .......... None
See application file for complete search history.

(56) References Cited

U.S. PATENT DOCUMENTS

| | | | | |
|---|---|---|---|---|
| 5,793,420 A | * | 8/1998 | Schmidt | 348/148 |
| 5,874,989 A | * | 2/1999 | O'Brien et al. | 348/148 |
| 6,124,886 A | * | 9/2000 | DeLine et al. | 348/148 |
| 6,738,089 B1 | * | 5/2004 | Silc | 348/148 |
| 7,005,973 B2 | * | 2/2006 | Haigh et al. | 340/433 |
| 2003/0095688 A1 | * | 5/2003 | Kirmuss | 382/105 |
| 2004/0101166 A1 | * | 5/2004 | Williams et al. | 382/104 |

OTHER PUBLICATIONS

"Stop Arm Feature" located on the following URL: www.seon.com/stoparm.html.
"Iowa Program Allows Districts to Trial Digital Stop Arm Cameras" located on the following URL: www.stnonline.com/stn/stnarticles/iowa_stoparmscams_0605.htm.
"New York Transportation Directors Discuss Illegal Passings" located on the following URL: www.stnonline.com/artman/publish/article_4551.shtml.

(Continued)

Primary Examiner—Daniel Wu
Assistant Examiner—Fekadeselassie Girma
(74) Attorney, Agent, or Firm—Husch Blackwell Sanders Welsh & Katz

(57) ABSTRACT

A system and method for discouraging stop-arm violations is provided having a image recording means positioned on a stop-arm of a bus, ice cream truck or other such vehicle. The image recording means may be a digital still camera or video camera and is connected to a storage unit, such as a video cassette recorder (VCR), a digital video recorder (DVR) or solid-state memory storage. The image recording means is configured to activate and begin recording images when the stop-arm is fully extended and cease recording of images once the stop-arm is fully retracted.

18 Claims, 4 Drawing Sheets

OTHER PUBLICATIONS

"Seon Design Inc." located on the following URL: http://www.seon.com/powerpoint/School%20Bus%20version%2022%20Dec%2005.ppt.

"Stop Arm Feature" located on the following URL: www.seon.com/stoparm.html, Jun. 11, 2005.

"Iowa Program Allows Districts to Trial Digital Stop Arm Cameras" located on the following URL: www.stnonline.com/stn/stnarticles/iowa_stoparmscams_0605.htm, Jan. 18, 2007.

"New York Transportation Directors Discuss Illegal Passings" located on the following URL: www.stnonline.com/artman/publish/article_4551.shtml, May 20, 2006.

"Seon Design Inc." located on the following URL: http://www.seon.com/powerpoint/School%20Bus%20version%2022%20Dec%2005.ppt, Dec. 20, 2005.

* cited by examiner

STOP-ARM MOUNTED CAMERA SYSTEM AND METHOD FOR MOUNTING SAME

I. FIELD OF THE INVENTION

The present invention relates generally to public safety related systems. More specifically, the present invention relates to a system and method for mounting a security camera on a stop-arm of a school bus or other vehicle.

II. BACKGROUND OF THE DISCLOSURE

Many children are injured or killed in traffic accidents at school bus stops. In a rush to catch a school bus in the morning or get home in the afternoon, children often fail to look both ways before entering a road, resulting in children being struck by oncoming vehicles. In an effort to reduce such incidents, all 50 states have laws require motorists to stop when a school bus is picking up or dropping of children. Most buses come equipped with stop-arms to notify motorists in the vicinity that the bus is either dropping off or picking up children and thus the motorists must come to a complete stop.

Many motorists fail to yield to stopped school buses (hereinafter referred to as "stop-arm violations"), even though such motorists risk severe penalties if observed by a law enforcement officer. However, law enforcement officers cannot follow school buses throughout an entire route, thus most incidents of stop-arm violations result in no consequences for the motorist. Stop-arm violations have become such a problem that in the state of North Carolina 2,000 stop-arm violations occur every day according to Bus Fleet Magazine. On a national level, that could easily translate into tens of thousands, if not hundreds of thousands, of violations each day.

While school bus drivers may be employed to crack down on stop-arm violations, bus drivers generally need to focus their attention on the children on the bus. Consequently, bus drivers may not have the time to record license plate numbers of these dangerous motorists.

Accordingly, a better means for discouraging stop-arm violations through better identification of motorists committing stop-arm violations is needed.

III. SUMMARY OF THE DISCLOSURE

An object of the present invention is to address the need for better ways to identify motorists that commit stop-arm violations.

The present invention provides a motor vehicle mountable apparatus for recording stop sign violations. The assembly includes a stop-sign assembly mountable to an external surface of the motor vehicle. The stop-sign assembly includes a stop sign and a mechanism for moving the stop sign between an open position and a close position. The apparatus also includes at least one image acquisition device, mounted on a portion of the stop sign, for acquiring images of a region proximate to the motor vehicle when the stop sign is in the open position. A storage device stores the images acquired by the at least one image acquisition device.

Additionally, the present invention provides a method for recording stop sign violations. The method includes the steps of mounting a stop-sign assembly to an external surface of a motor vehicle, said stop-sign assembly including a stop sign; actuating the stop sign between an open position and a close position; acquiring images of a region proximate to the motor vehicle when the stop sign is in the open position; and storing the images acquired in said image acquiring step. The image acquisition being performed by at least one image acquisition device mounted on a portion of said stop sign.

Further, the present invention can include a rotation mount for the image acquisition device so that the image acquisition device can be manually or automatically controlled to rotate between two extreme positions of at least one axis.

In addition, the present invention contemplates at least a second image acquisition device. The at least two image acquisition devices are positioned so that the field of view of each image acquisition device does not overlap the field of view of the other image acquisition device.

IV. BRIEF DESCRIPTION OF THE DRAWINGS

These and other features, aspects, and advantages of the present invention will become better understood with regard to the following description, appended claims, and accompanying drawings wherein:

V. DETAILED DESCRIPTION OF DISCLOSURE

Figure 1:
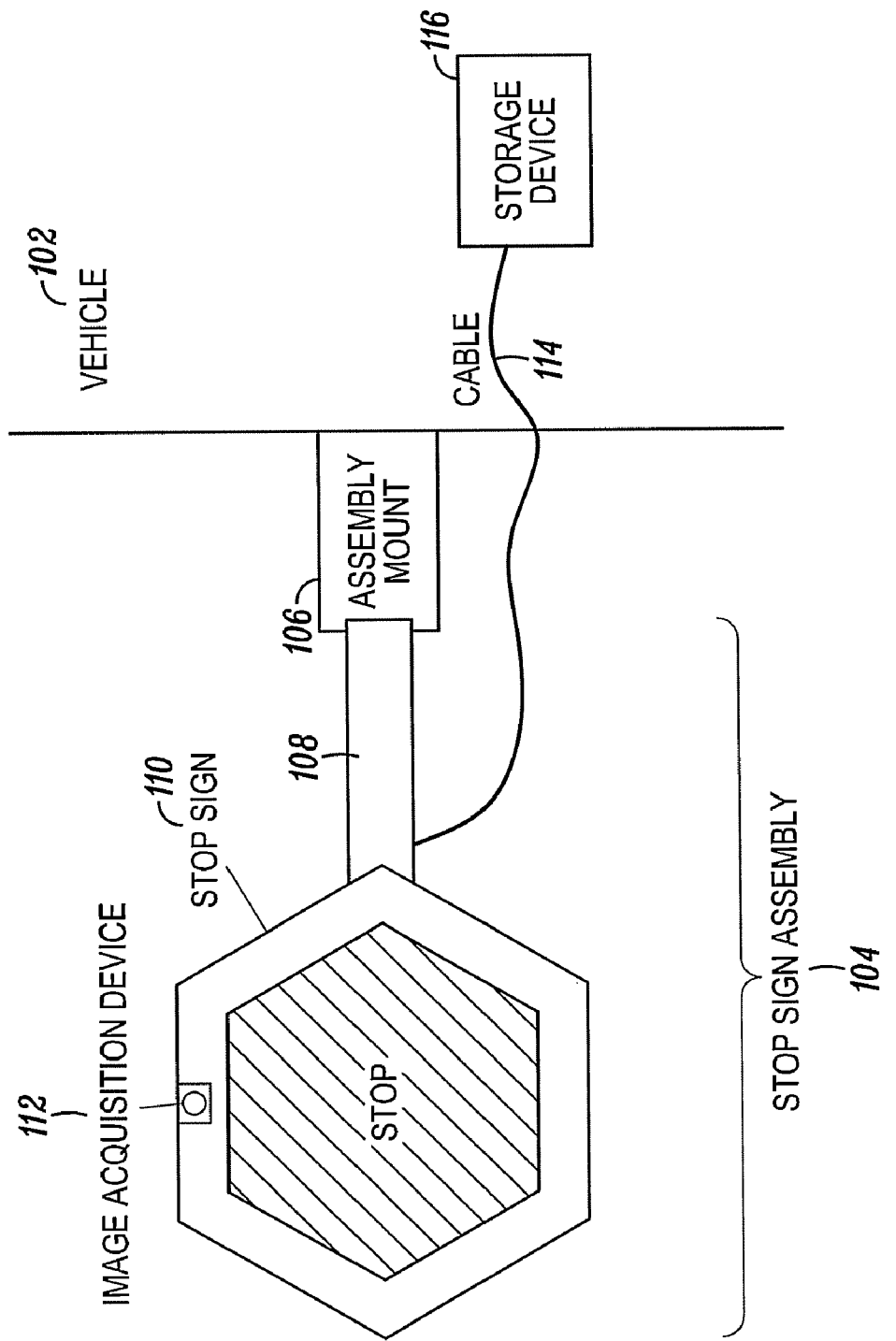
FIG. 1 illustrates a schematic representation of a stop-sign assembly in accordance with the present invention.

Referring to FIG. 1, a stop-sign assembly 104 is shown. The stop-sign assembly 104 includes a mounting member 106 affixed to a side of a vehicle 102 at one end, and fitted with an arm 108. The mounting member may be constructed as a swivel or hinge such that an actuation mechanism positioned inside the vehicle allows a driver to actuate the arm 108 between a folded, or closed, position and an unfolded, or open, position. However, any mounting means may be used that provides the arm 108 to move between an open position and a closed position. The actuation mechanism may be mechanical or electromechanical in nature. At an opposite end of the arm 108 a stop sign 110 is affixed.

An image acquisition device 112 is positioned on the stop sign 110. While FIG. 1 shows the image acquisition device 112 located at the top edge of the stop sign 110, the present invention is not limited to this configuration only, but rather the image acquisition device may be placed at any location on the stop sign 110. The image acquisition device may be any device capable of acquiring images, such as a digital still camera, or a digital video camera. Film cameras may be used in place of digital cameras, the film in the film camera acting as both the acquiring and storage devices.

A cable 114 adapted for carrying video signals runs from the image acquisition device 112 to a storage device 116, such as a video cassette recorder (VCR), digital video recorder (DVR), CD or DVD recorder, hard drive, solid-state memory storage, or any other appropriate storage device.

The image acquisition device 112 and video storage device 116 are activated and begin recording video when the stop-sign assembly 104 is fully extended and terminate recording when the stop-sign assembly 104 is retracted. In this way, when a motorist is in proximity to an extended stop-arm, a video of the vehicle is recorded with emphasis placed on recording the license plate number. However, with a wide enough field of view, the camera can also record an image of the driver of the violating vehicle. Consequently, a positive identification of the driver can be made as well as identification of the motor vehicle, if the vehicle is committing a stop-arm violation. The lens on the image acquisition device 112 may be any size from 2.9 mm up to 16 mm depending upon the field of view desired. In addition, the region imaged by the image acquisition device 112 may be a rear view, forward view, or both forward and rear views simultaneously. In the case of a simultaneous forward and rear view, two image acquisition devices may be used and coupled to one or more video storage devices.

In the event that a stop-arm violation occurs, the driver of the school bus can provide law enforcement authorities with video of the violating vehicle showing the license plate number and possibly the face of the driver. With this evidence, law enforcement authorities will be able to track down violators and thus better enforce stop-arm related ordinances.

Additionally, each frame of the video recording may be embedded with a date and time stamp. The date and time stamp providing further information for determining when a stop-arm violation occurs and enhance law enforcement efforts.

Figure 2:
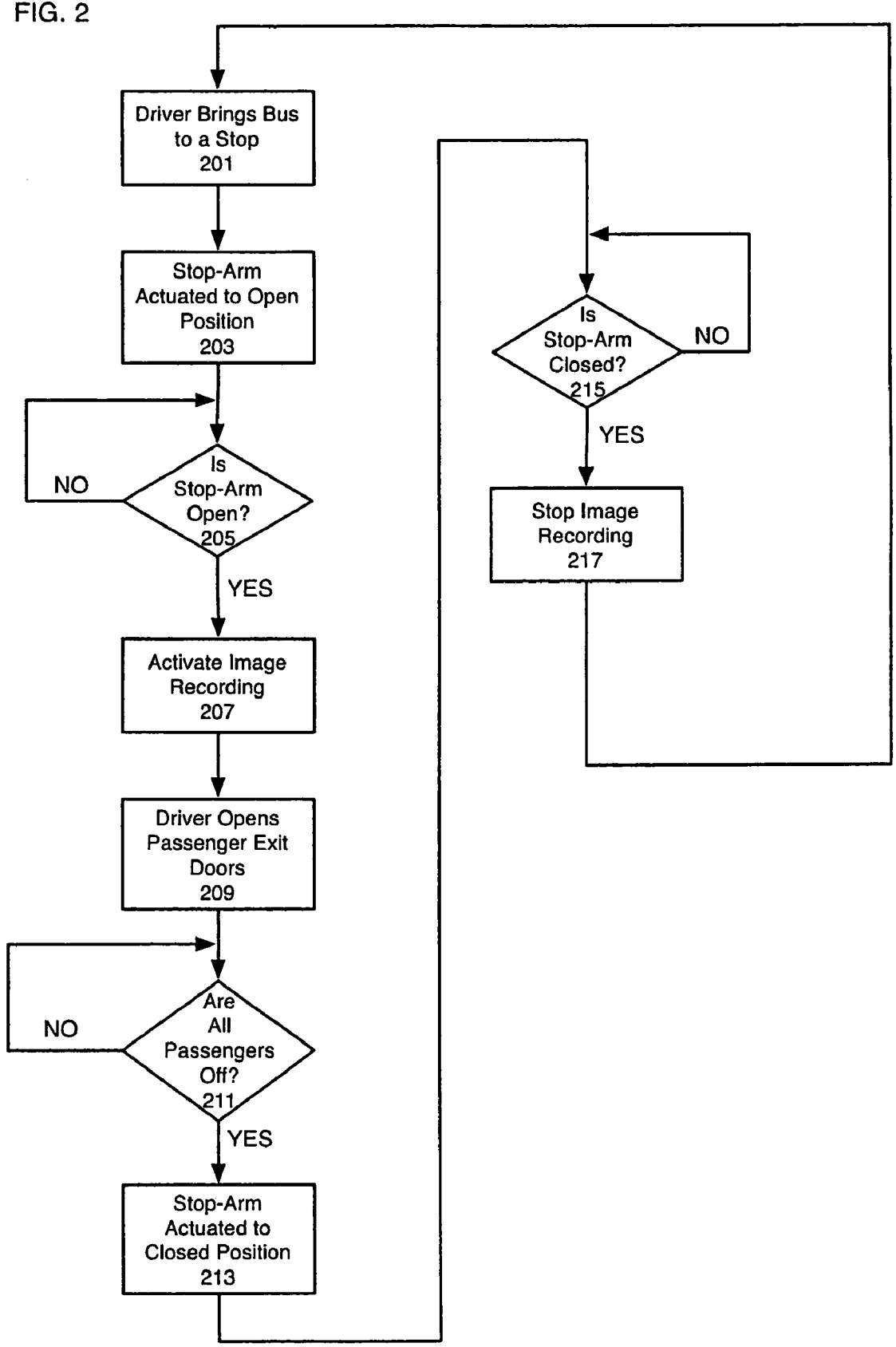
FIG. 2 is a flowchart illustrating the steps for performing an embodiment of the present invention.

Turning to FIG. 2, the steps for performing an embodiment of the present invention are provided. Beginning at step 201, a driver of a bus comes to a stop to either pick up or drop off passengers. The driver actuates the stop-arm to the open position in step 203. When, in step 205, a sensor determines that the stop arm is fully open the procedure continues on to step 207. At step 207, an image acquisition device is activated and begins acquiring images of an area in proximity to the bus. This area may be a wide-angle rear view, wide-angle forward view, or both forward and rear views simultaneously. In the case of a simultaneous forward and rear view, two image acquisition devices may be used and coupled to one or more storage devices.

Once the image acquisition device has been activated, the driver opens the doors to receive or unload passengers in step 209. Once the driver has determined that all the passengers have entered or exited the bus in step 211, the process proceeds to step 213. The stop-arm is actuated to the closed position in step 213. Once the stop-arm is sensed to be fully closed in step 215, the image acquisition device stops acquiring images in step 217. This procedure is performed each time the driver receives or unloads passengers.

The embodiment discussed above employs an image acquisition device that is automatically activated when the stop sign is placed in the open position, however the present invention is not limited to this one embodiment. Alternatively, the driver of the school bus may activate the image acquisition device manually.

It should be noted that a similar procedure is performed when the stop-arm is mounted on ice cream truck or other such vehicle that is predominately attractive of children. In the case of an ice cream truck, rather than opening a passenger door in step 209, step 209 is defined as providing sale of ice cream or other product. Subsequently, step 211 provides for determining if all customers have been served and have left the vicinity of the vehicle.

One skilled in the art would be capable of determining proper modification of the above-provided steps for a particular circumstance in order to maximize the safety of children that may be near the vehicle.

By positioning the image acquisition device on stop sign portion of the stop-arm, a better recording angle is provided for recording a license plate number or driver of a vehicle passing the stop-arm. Whereas image acquisition devices positioned on the bus body would need to be positioned at an extreme angle in order to image a vehicle violating a stop-arm. At such an extreme angle it may be difficult for the bus-mounted image acquisition device to image the license plate. The same disadvantage is present in image acquisition devices mounted on the stop-arm rather than the stop sign portion.

Figure 3:
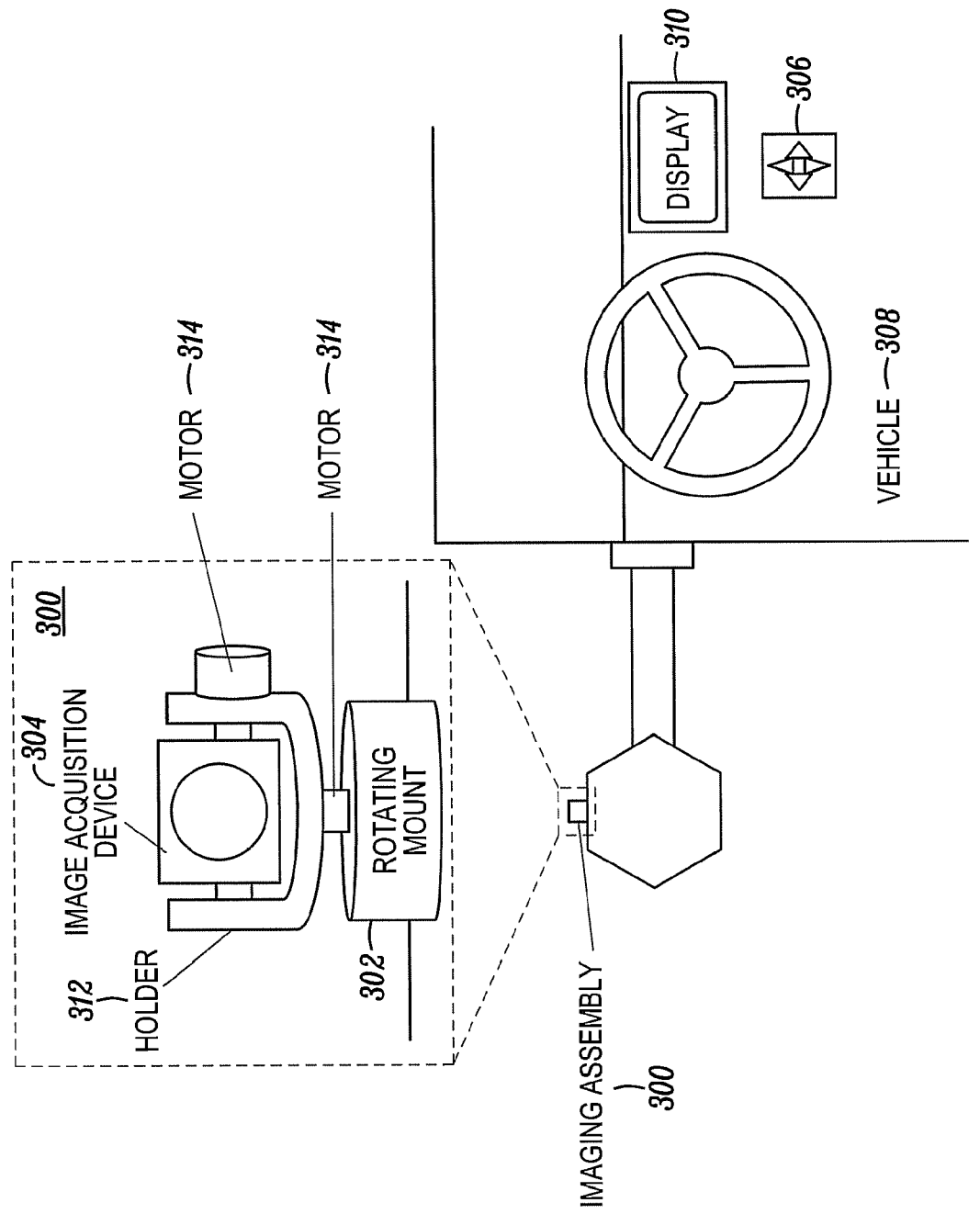
FIG. 3 illustrates a schematic representation of a portion of a stop-sign assembly having a rotatable camera in accordance with the present invention.

Referring to FIG. 3, an embodiment of the present invention provides an imaging assembly 300 having a rotating mount 302 that allows an image acquisition device 304 to pan horizontally and/or vertically. The rotating mount 302 is connected to a controller 306 situated in the school bus 308 or other stop-arm equipped vehicle. The rotating mount 302 includes a holding member 312 adapted for holding the image acquisition device 304 and one or more motors 314 configured for providing rotational motion around at least one axis.

The controller 306 may be a manual control that allows a driver to control the movement of the image acquisition device 304 so that nearby vehicles may be better imaged and the license plate or driver identity is easier to identify. With the controller 306 being manually controlled, a video display device 310 is included for providing the driver with a view of the real-time images being recorded by the image acquisition device 304. The driver, using the images displayed on the video display device 310, thus is able to aim the image acquisition device at specific vehicles in order to acquire a clear image of license plates. Alternatively, the controller 306 may be an automated controller that instructs the image acquisition device 304 to pan from one preset position to another over a predefined time interval.

Figure 4:
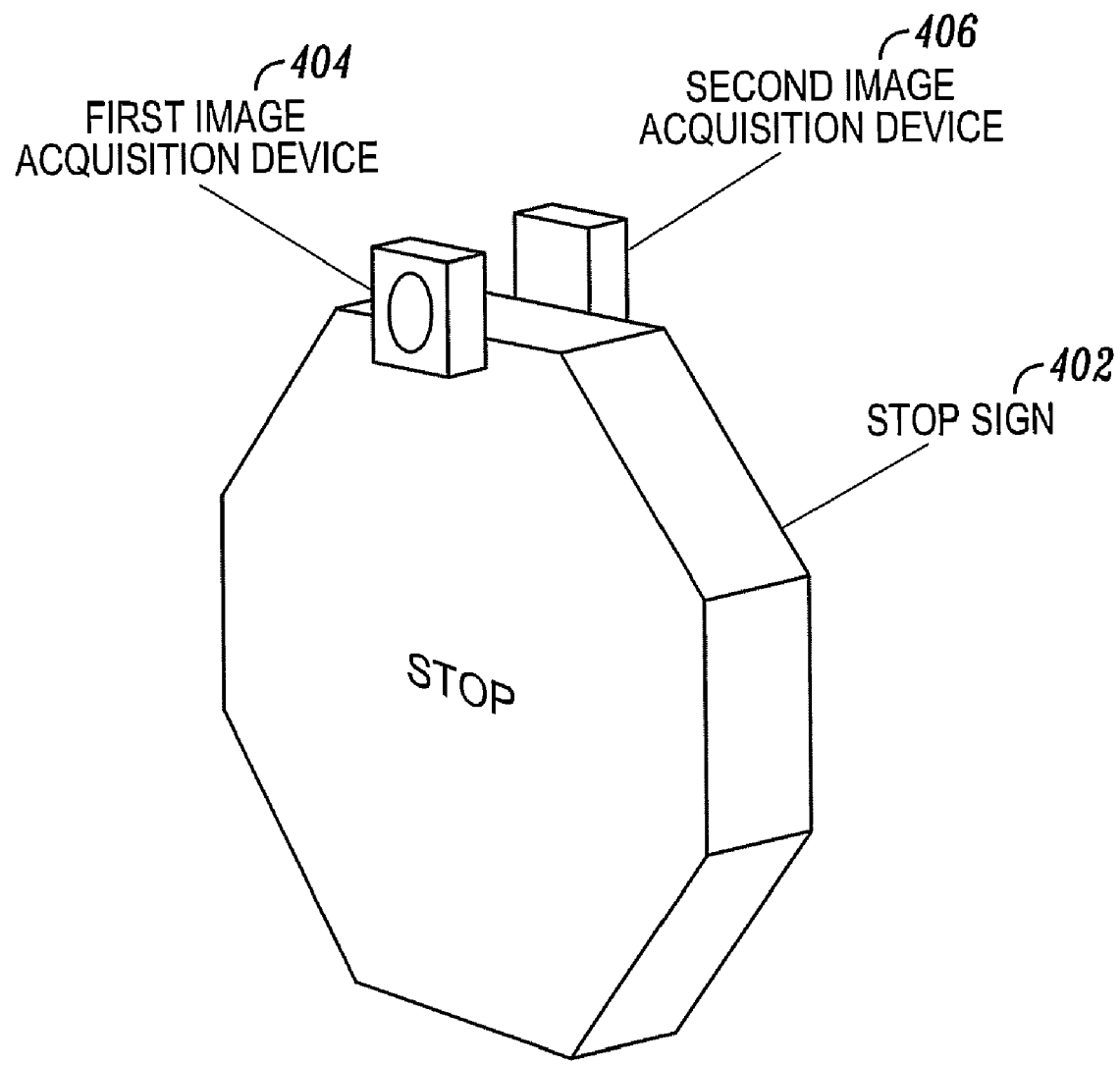
FIG. 4 illustrates a schematic representation of a dual-camera stop-sign assembly in accordance with the present invention.

Another embodiment is shown in FIG. 4 having a stop sign 402 equipped with two image acquisition devices 404 and 406. In this case, one image acquisition device 404 is positioned to record images of the area to the rear of the stop sign 402, while the second image acquisition device 406 records images of the area forward of the stop sign 402. The forward and rear-facing image acquisition device configuration is highly advantageous in localities where license plates are only required on either the front or the rear of a vehicle, or where the violating vehicle is missing a license plate.

Additional image acquisition devices may be attached to the stop sign 402, as well, to provide coverage of all approaches. For example, with three image acquisition devices it would be advantageous to position each at 90° angles. In this way, the three image acquisition devices would image traffic traveling perpendicular to the stopped school bus as well as forward, and rearward. This configuration provides added benefit since often school buses pick up and drop off children at corners where two or more roads intersect.

The image acquisition device may be embedded in the stop sign portion of the stop-sign assembly, as shown in FIG. 1, affixed to a circumferential edge of the stop sign portion as shown in FIG. 3 and FIG. 4, or affixed on the front or rear face of the stop sign portion. Affixing means are well known in the art and any applicable method for affixing the image acquisition device is contemplated as being a part of the present invention. Such affixing means may include nuts and bolts, rivets, welds, and epoxy or other bonding chemical.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A stop-sign assembly mountable to an external surface of a motor vehicle and which includes, a mechanism for moving said stop sign between an open position and a closed position; comprising:
   at least two image acquisition devices for acquiring images of a region proximate to said motor vehicle when said stop sign is in said open position, and wherein each of said at least two image acquisition devices have a field of view which is substantially non-overlapping;
   said at least two image acquisition devices being mounted on a portion of said stop sign;
   a storage device for storing said images acquired by said at least two image acquisition devices; and
   a rotation mount for the at least two image acquisition devices.

2. The stop-sign assembly of claim 1, wherein said at least two image acquisition devices are is adapted for acquiring continuous video during a duration in which said stop arm is in said open position.

3. The stop-sign assembly of claim 1, wherein said at least two image acquisition devices are adapted for acquiring still images at predetermined intervals during a duration in which said stop arm is in said open position.

4. The stop-sign assembly of claim 1, comprising at least one image acquisition device having a field view forward of said stop sign, and at least one image acquisition device having a field of view rearward of said stop sign.

5. The stop-sign assembly of claim 1, wherein a date and time stamp is embedded in said acquired images.

6. The stop-sign assembly of claim 1, wherein said storage devices are selected from a group consisting of video cassette recorder (VCR), digital video recorder (DVR), CD/DVD recorder, hard drive and solid-state memory storage.

7. The stop-sign assembly of claim 1, wherein said rotation mount of said image acquisition devices are manually controlled by a driver of said motor vehicle, and said assembly further comprising;
   a video display for displaying to said driver real-time images acquired by said at least two image acquisition devices; and
   a manual rotation controller configured for accepting inputs from said driver and, based on said inputs, providing control outputs to said rotation mount for controlling the position of at least one image acquisition device.

8. The stop-sign assembly of claim 1, further comprising a rotation controller for rotating said at least one image acquisition device between two positions at a predetermined rate.

9. A method for recording stop sign violations, said method comprising:
   mounting a stop-sign assembly to an external surface of a motor vehicle, said stop-sign assembly including a stop sign;
   actuating said stop sign between an open position and a close position;
   acquiring images of a region proximate to said motor vehicle when said stop sign is in said open position;
   said image acquisition being performed by at least two image acquisition devices mounted on a portion of said stop sign and each of said at least two image acquisition devices having a field of view substantially non-overlapping;
   storing said images acquired in said image acquiring step; and
   a rotation mount for at least one image acquisition device.

10. The method as in claim 9, wherein at least one image acquisition device is a digital camera.

11. The method as in claim 9, wherein said image acquiring step acquires continuous video during a duration in which said stop sign is in said open position.

12. The method as in claim 9, wherein said image acquisition devices acquires still images at predetermined intervals during a duration in which said stop sign is in said open position.

13. The method as in claim 9, wherein images acquired in said image acquiring step include a date and time stamp embedded therein.

14. The method as in claim 9, wherein said storing step stores said images in a storage device selected from a group consisting of video cassette recorder (VCR), digital video recorder (DVR), CD/DVD recorder, hard drive and solid-state memory storage.

15. The method as in claim 9, further comprising rotating at least one image acquisition device.

16. The method as in claim 15, wherein a driver of said motor vehicle manually controls rotation of at least two image acquisition device.

17. The method as in claim 16, further comprising displaying to said driver real-time images acquired by said at least two image acquisition devices.

18. The method as in claim 15, further comprising automatically controlling rotation of at least one image acquisition device between two positions at a predetermined rate.

* * * * *